United States Patent [19]

Oonishi et al.

[11] Patent Number: 5,423,052
[45] Date of Patent: Jun. 6, 1995

[54] CENTRAL PROCESSING UNIT WITH SWITCHABLE CARRY AND BORROW FLAG

[75] Inventors: Kenji Oonishi; Tsunenori Umeki, both of Hyogo, Japan

[73] Assignee: Mitsubishi Denki Kabushiki Kaisha, Japan

[21] Appl. No.: 21,431

[22] Filed: Feb. 23, 1993

[30] Foreign Application Priority Data

Apr. 1, 1992 [JP] Japan ................. 4-108825

[51] Int. Cl.6 ............... G06F 9/00; G06F 9/302
[52] U.S. Cl. ................. 395/800; 364/736; 364/232.8; 364/258.0; 364/259.1; 364/DIG. 1
[58] Field of Search ............. 395/800, 775, 375, 650; 364/736, 736.5, 748, 754, 761, 768

[56] References Cited

U.S. PATENT DOCUMENTS

| | | | |
|---|---|---|---|
| 4,323,981 | 4/1982 | Nakamura | 364/749 |
| 4,774,688 | 9/1988 | Kobayashi et al. | 395/375 |
| 4,811,266 | 3/1989 | Woods et al. | 364/736.5 |
| 4,839,846 | 6/1989 | Hirose | 364/748 |
| 4,872,131 | 10/1989 | Kubota et al. | 364/736 |
| 4,901,268 | 2/1990 | Judd | 364/745 |

FOREIGN PATENT DOCUMENTS 0206346 12/1986 European Pat. Off. ........ G06F 7/48

Primary Examiner—Alyssa H. Bowler
Assistant Examiner—Alpesh M. Shah
Attorney, Agent, or Firm—Townsend nnd Townsend Khourie and Crew

[57] ABSTRACT

For obtaining a central processing unit to perform, with the same operation code, an operation in which a carry input is effective and an operation in which the carry input is invalid or an operation in which a borrow input is effective and an operation in which the borrow input is invalid, between an output of a carry and borrow flag and a carry and borrow input of an ALU there is provided a switching circuit to switch the input of the ALU by a control signal different from a control signal of the central processing unit due to an operation code.

10 Claims, 9 Drawing Sheets

CENTRAL PROCESSING UNIT WITH SWITCHABLE CARRY AND BORROW FLAG

BACKGROUND OF THE INVENTION

1. Field of the Invention

The present invention relates to an operation system of a central processing unit provided in a microcomputer or microprocessor.

2. Description of the Prior Art

Figure 7:
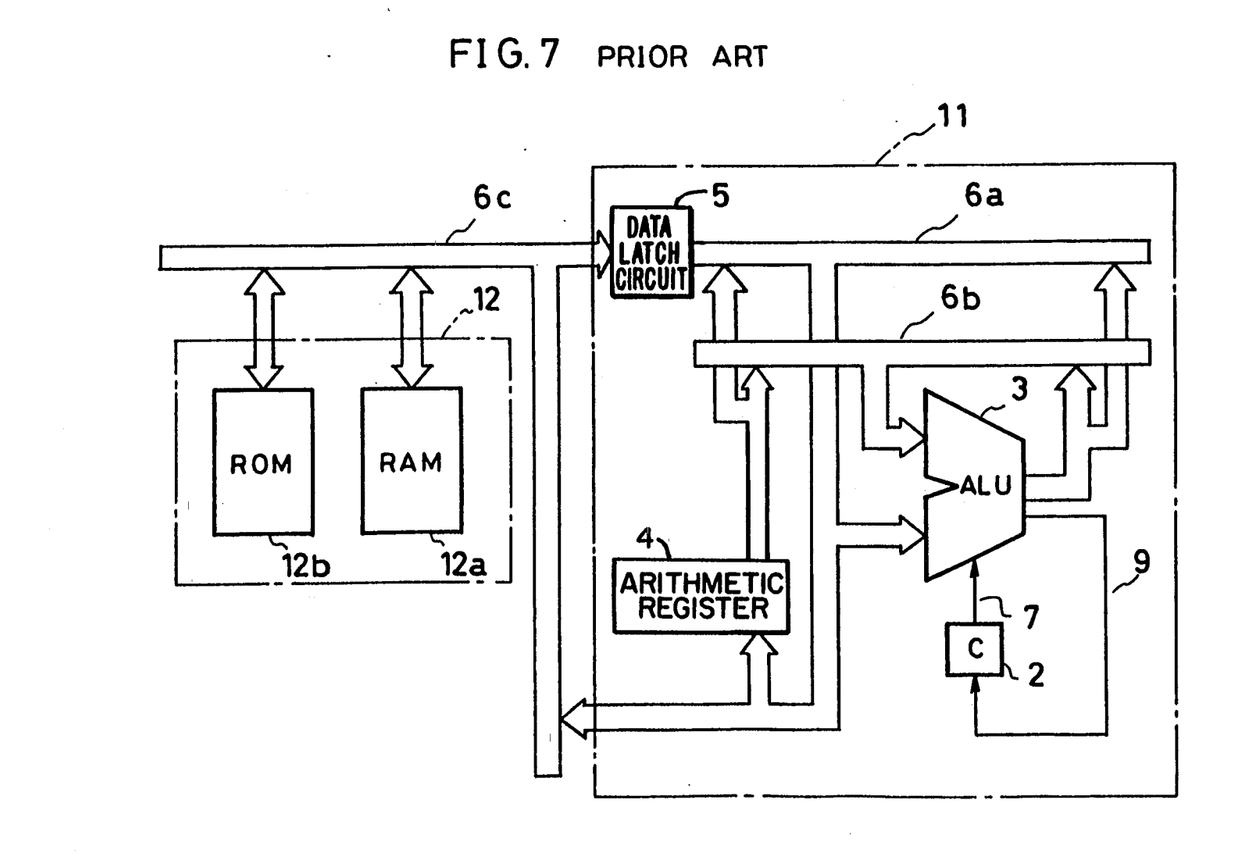
FIG. 7 is a block diagram showing an arrangement of a microcomputer based on a conventional operation system.

FIG. 7 is a block diagram showing an arrangement of a microcomputer based on a conventional operation system. In FIG. 7, numeral 11 designates a central processing unit (which will be referred hereinafter to as a CPU) and 12 denotes a memory. The CPU 11 comprises a data latch circuit 5 for latching data for an operation from the memory 12, an arithmetic register 4 for storing data for operations and operation (calculation) results, a carry and borrow flag 2 for storing a carry indicative of the operation result to be stored in the arithmetic register 4 exceeding a predetermined number of bits and further for storing a borrow indicative of a digit (figure) borrow when the content of the data latch circuit 5 cannot be subtracted from the content of the arithmetic register 4, and an arithmetic and logic unit (which will be referred hereinafter to as an ALU) 3 for performing operations on the basis of the contents of the data latch circuit 5, the contents of the arithmetic register 4 and the contents of the carry and borrow flag 2 to store the operation results in the arithmetic register 4 and the carry and borrow flag 2. The CPU 11 performs the operations in accordance with programs written in the memory 12. The memory 12 comprises a ROM 12b for storing data and programs and a RAM 12a for temporarily storing data necessary for operations. Here, although the programs can be written in either the read-only ROM 12b or the readable and writable RAM 12a, it is general to write them in the ROM 12b. Accordingly, the following description will be made as the programs are written in the ROM 12b.

Secondly, the operation of the operation system will be described hereinbelow with reference to FIG. 7. The CPU 11 operates in accordance with a program written in the ROM 12b of the memory 12. In response to the CPU 11 reading operation codes on the program, the operation codes read are inputted to a control unit, not shown, of the CPU 11 and the control unit operates the CPU 11 in accordance with a procedure determined by the respective operation codes.

Figure 8:
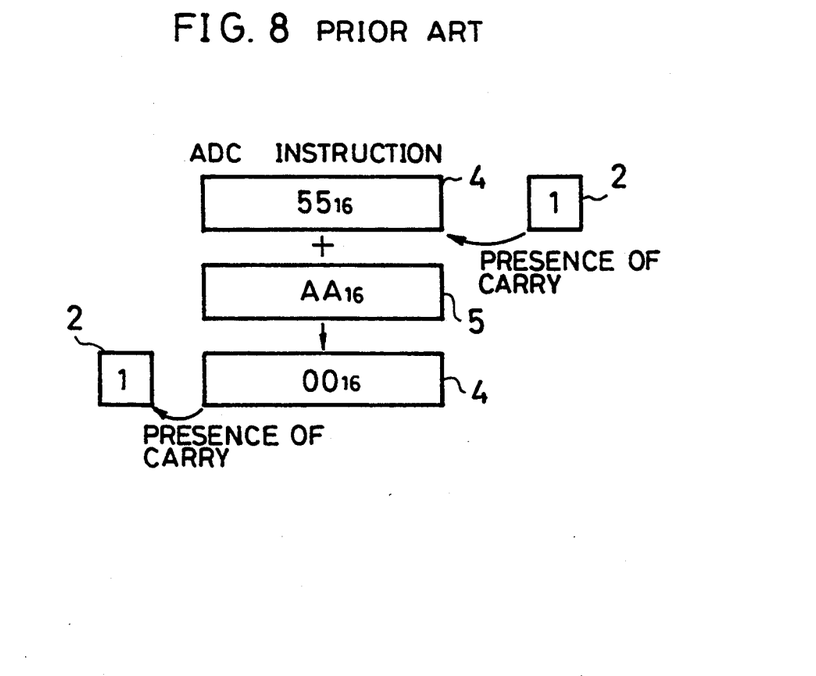
FIG. 8 is an illustration for describing an ADC instruction.

FIG. 8 is an illustration for describing an ADC instruction. The ADC instruction is an instruction for adding together the content of the arithmetic register 4, the content of the memory 12 and the content of the carry and borrow flag 2. Here, the content of the memory 12 means data stated as operands on a program within the memory 12, data written in the ROM 12b or data temporarily stored in the RAM 12a. The content "1" of the carry and borrow flag 2 before the operation indicates that the operation data takes a carry from a lower-order position, i.e., takes a figure up one place, and the content "0" of the carry and borrow flag 2 before the operation indicates that the operation data does not take the carry from the lower-order position. The calculation result is stored in the arithmetic register 4. In the case that the calculation result exceeds the number of bits of the arithmetic register 4, the content of the carry and borrow flag 2 becomes "1" at the time of the completion of the operation. On the other hand, in the case that the calculation result is below the number of bits of the arithmetic register 4, the content of the carry and borrow flag 2 becomes "0" at the time of the completion of the operation.

Figure 9:
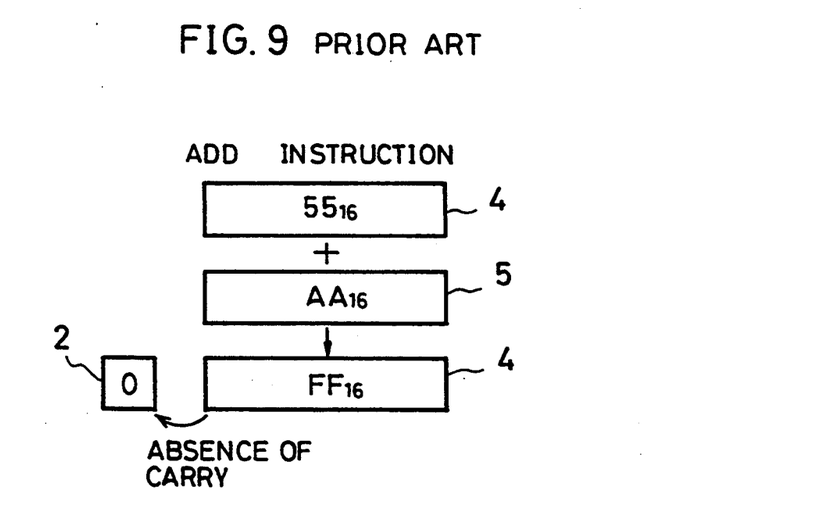
FIG. 9 is an illustration for describing an ADD instruction.

FIG. 9 is an illustration for describing an ADD instruction. The ADD instruction is an instruction for adding together the content of the arithmetic register 4 and the content of the memory 12. The calculation result is stored in the arithmetic register 4. In the case that the calculation result exceeds the number of bits of the arithmetic register 4, the content of the carry and borrow flag 2 becomes "1" at the time of the completion of the operation. In the case that the calculation result is below the number of bits of the arithmetic register 4, the content of the carry and borrow flag 2 becomes "0" at the time of the completion of the operation.

Figure 10:
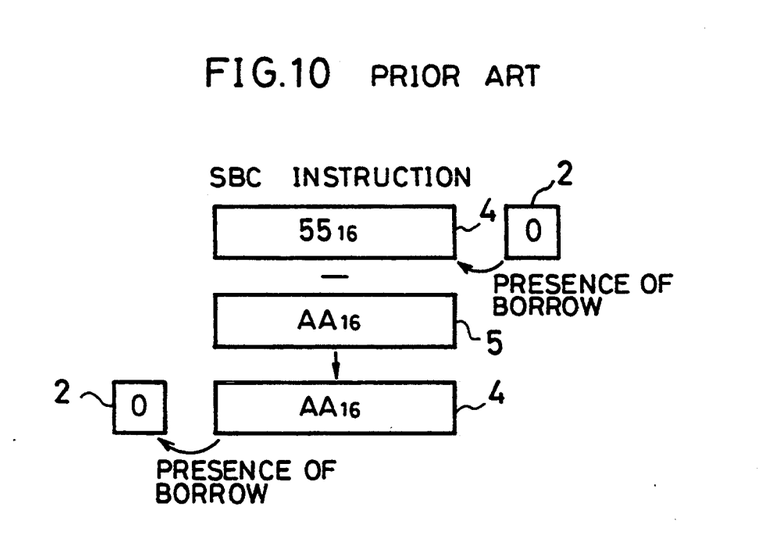
FIG. 10 is an illustration for describing an SBC instruction.

FIG. 10 is an illustration for describing an SBC instruction. The SBC instruction is an instruction for subtracting the content of the memory 12 and the content of the carry and borrow flag 2 from the content of the arithmetic register 4. The content "0" of the carry and borrow flag 2 before the operation indicates that the operation data takes a digit borrow from a lower-order position, and the content "1" of the carry and borrow flag 2 before the operation indicates that the operation data does not take the borrow from the lower-order position. The calculation result is stored in the arithmetic register 4. In the case that the content of the memory 12 and the content of the carry and borrow flag 2 cannot be subtracted from the content of the arithmetic register 4, that is, when a borrow occurs in the calculation result, the content of the carry and borrow flag 2 becomes "0" at the time of the completion of the operation. On the other hand, in the case that the borrow does not occur in the calculation result, the content of the carry and borrow flag 2 becomes "1" at the time of the completion of the operation.

Figure 11:
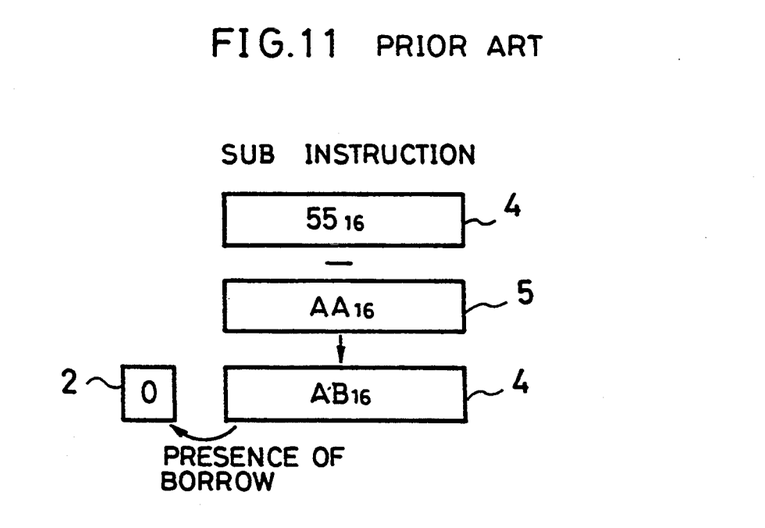
FIG. 11 is an illustration for describing an SUB instruction.

FIG. 11 is an illustration for describing an SUB instruction. The SUB instruction is an instruction for subtracting the content of the memory 12 from the content of the arithmetic register 4. The calculation result is stored in the arithmetic register 4. In the case that the content of the memory 12 and the content of the carry and borrow flag 2 cannot be subtracted from the content of the arithmetic register, that is, when a borrow occurs in the calculation result, the content of the carry and borrow flag 2 becomes "0" at the time of the completion of the operation. When the borrow does not occur in the calculation result, the content of the carry and borrow flag 2 becomes "1" at the time of the completion of the operation.

For example, in the case that the ADC instruction is executed in an immediate addressing mode where an operand (operator) is stated in a program, when an operation code (instruction code) on the program is read and inputted to the CPU 11, the CPU 11 causes the operand to be latched as immediate value operation data (for example, DATA1) in the data latch circuit 5. The DATA 1 of the data latch circuit 5 passes through an internal bus 6a of the CPU 11 to be inputted to the ALU 3, the data (for example, DATA2) of the arithmetic register 4 passes through an internal bus 6b of the CPU 11 to be inputted to the ALU 3, and the data (for example, C1) of the carry and borrow flag 2 passes through a data line 7 to be inputted to the ALU3. The DATA1, DATA2 and C1 are added together in the ALU 3 and the calculation result (SUM) is inputted through the internal bus 6a of the CPU 11 to the arithmetic register 4. At this time, the output of the data latch circuit 5 is set to OFF. Further, the carry (for example, C2) of the calculation result is inputted through a data line 9 to the carry and borrow flag 2. The ADC instruction is completed with the aforementioned procedure.

Similarly, in the case of executing the ADD instruction in the immediate addressing mode, in response to an operation code on the program being read to the CPU 11, the CPU 11 causes the operand to be latched as the immediate value operation data DATA1 in the data latch circuit 5. The DATA1 of the data latch circuit 5 is inputted through the internal bus 6a of the CPU 11 to the ALU 3 and the data DATA2 of the arithmetic register 4 is inputted through the internal bus 6b of the CPU 11 to the ALU3. At this time, the carry input of the least significant bit of the ALU 3 is fixed to "0". The DATA 1 and the DATA 2 are added to each other in the ALU 3 and the calculation result SUM is inputted through the internal bus 6a of the CPU 11 to the arithmetic register 4. At this time, the output of the data latch circuit 5 is OFF. Further, the carry C2 of the calculation result is inputted through the data line 9 to the carry and borrow flag 2. The ADD instruction is completed with the aforementioned procedure.

Further, in the case of executing the SBC instruction in the immediate addressing mode, when an operation code on the program is read to the CPU 11, the CPU 11 causes the operand DATA1 to be latched as the immediate value in the data latch circuit 5. The DATA1 of the data latch circuit 5 is inputted through the internal bus 6a of the CPU 11 to the ALU 3 so as to be bit-inverted in the ALU 3 to become DATA1B. The data DATA2 of the arithmetic register 4 is inputted through the internal bus 6b of the CPU 11 to the ALU 3 and the data B1 of the carry and borrow flag 2 is inputted through the data line 7 to the ALU 3. The DATA1B, DATA2 and B1 are added together in the ALU 3, and the calculation result SUM is inputted through the internal bus 6a of the CPU 11. At this time, the output of the data latch circuit 5 is OFF. The SBC instruction is completed with the aforementioned procedure.

Still further, in the case of executing the SUB instruction in the immediate addressing mode, when an operation code on the program is read to the CPU 11, the CPU 11 causes the operand DATA1 to be latched as the immediate value in the data latch circuit 5. The DATA1 of the data latch circuit 5 is inputted through the internal bus 6a of the CPU 11 to the ALU 3 so as to be bit-inverted to be DATA1B in the ALU 3. The data DATA2 of the arithmetic register 4 is inputted through the internal bus 6b of the CPU 11 to the ALU 3. The data C1 of the carry and borrow flag 2 is inputted through the data line 7 to the ALU 3. At this time, the borrow input of the least significant bit of the ALU 3 is fixed to "1". The DATA1B and DATA2 are added together in the ALU 3, and the calculation result SUM is inputted through the internal bus 6a of the CPU 11 to the arithmetic register 4. At this time, the output of the data latch circuit 5 is OFF. Further, the borrow B2 of the calculation result is inputted through the data line 9 to the carry and borrow flag 2. The SUB instruction is completed with the aforementioned procedure.

As described above, the difference between the ADC instruction and the ADD instruction or the difference between the SBC instruction and the SUB instruction relates to whether the content of the carry and borrow flag to be inputted to the ALU 3 is effective or invalid, while the microcomputer based on the conventional operation system performs one operation determined by one operation code. Thus, for supporting the ADC instruction and the ADD instruction, different operation codes are required. It is similar in the cases of supporting the SBC instruction and the SUB instruction. Accordingly, there is a problem that, for supporting the effective operation of the carry input or borrow input and the invalid operation of the carry input or borrow input in a plurality of addressing modes, the number of the operation codes is required to double as compared with the case of supporting one of the operations.

SUMMARY OF THE INVENTION

The present invention has been developed in order to eliminate the above-mentioned problem, and it is therefore an object of this invention to provide an operation system which is capable of executing, with the same operation code, the operation in which the carry input or borrow input is effective and the operation in which the carry input or borrow input is invalid.

An operation system according to this invention is provided with switching means (switching circuit 1) to change the content of a carry and borrow flag 2 to be inputted to an arithmetic and logic unit 3. In accordance with a control signal 10 inputted to the switching means, the operation in which a carry input or borrow input inputted to the arithmetic and logic unit 3 is effective and the operation in which the carry input or borrow input is invalid are switched from each other, thereby executing the operations with the same instruction.

In this invention, the content of the carry and borrow flag 2 is changed in accordance with the control signal 10 inputted to the switching means (switching circuit 1) so as to switch between the operation in which the carry input or borrow input to the arithmetic and logic unit is effective and the operation in which the carry input or borrow input is invalid.

The above and other objects, features, and advantages of the Invention will become more apparent from the following description when taken in conjunction with the accompanying drawings.

DESCRIPTION OF THE PREFERRED EMBODIMENT

Figure 1:
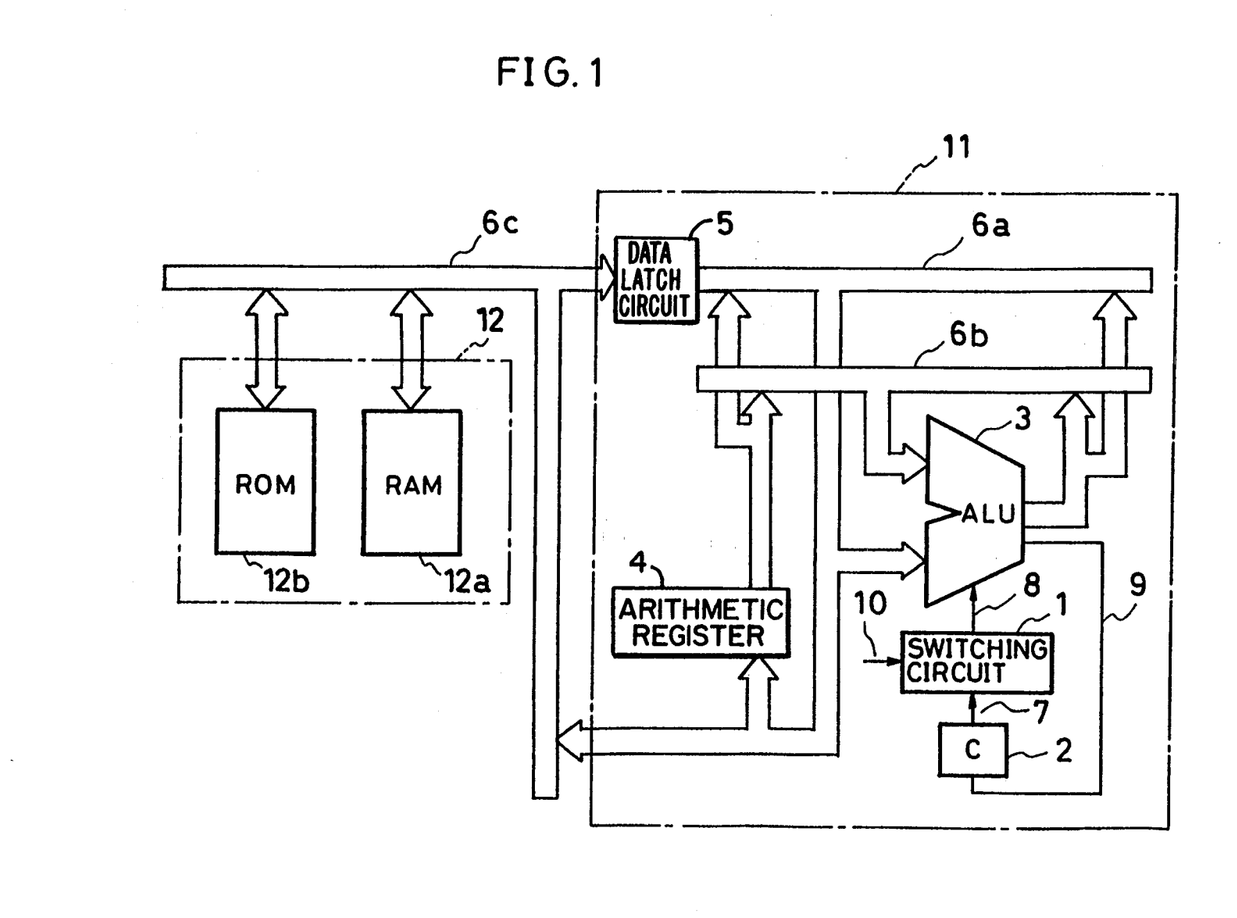
FIG. 1 is a block diagram showing an arrangement of a microcomputer based on an operation system according to a first embodiment of the present invention.
Figure 2:
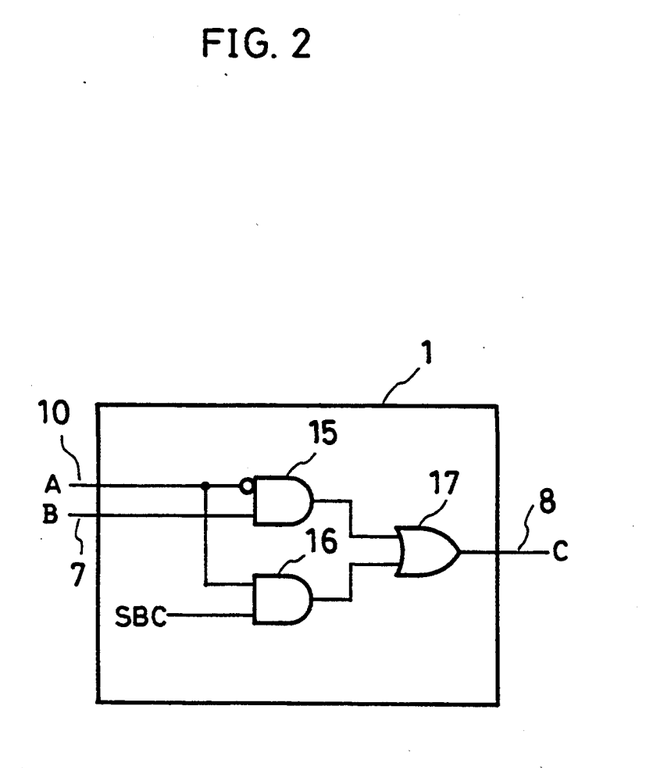
FIG. 2 is a circuit diagram showing one example of switching circuits according to this embodiment.

FIG. 1 is a block diagram showing an arrangement of a microcomputer comprising an operation system according to a first embodiment of this invention where parts corresponding to those in FIG. 7 are marked with the same references and the description thereof will be omitted. In FIG. 1, numeral 1 represents a switching circuit which acts as a switching means to change the content of a carry and borrow flag 2 to be inputted to an ALU 3. A circuit arrangement of this switching circuit 1 is illustrated in FIG. 2. In FIGS. 2 and 1, character A represents a control signal to the switching circuit 1, B designates an input from the carry and borrow flag 2, C denotes a carry-borrow input to the ALU 3, and SBC is a control signal of a CPU 1 which becomes "1" at the time of the execution of the SBC instruction. An OR gate 17 outputs "1" when either the output of a composite 15 or the output of an AND gate 16 is "1". In the case that the control signal A is "0", the output of the AND gate 16 always becomes "0". The composite gate 15 outputs "0" when the input B is "0" and outputs "1" when the input B is "1". Thus, when the control signal A is "0", the value of the input B becomes equal to the value of the input C. When the control signal A is "1", the output of the composite gate 15 always becomes "0", and the AND gate 16 outputs "0" since the SBC becomes "0" at the time of the execution of the ADC instruction, and outputs "1" since the SBC becomes "1" at the time of the SBC instruction. Accordingly, in the case that the control signal A is "1", the output C becomes "0" at the time of the execution of the ADC instruction and becomes "1" at the time of the execution of the SBC instruction.

In the microcomputer having an arrangement illustrated in FIG. 1, in the case of executing the ADC instruction or SBC instruction in the state that the control signal 10 is "0", since the output 7 of the carry and borrow flag 7 becomes equal to the output 8 of the switching circuit 1, as well as in the conventional microcomputer, the data of an arithmetic register 4, the data of a data latch circuit 5 and the content of the carry and borrow flag 2 are added together in the ALU 3. In the case of executing the ADC instruction in the state that the control signal 10 is "1", since the output 8 of the switching circuit 1 becomes "0", the execution result becomes the addition result (sum) of the data of the arithmetic register 4 and the data of the data latch circuit 5 so as to be equal to the execution result of the ADD instruction. Further, in the case of executing the SBC instruction in the state that the control signal 10 is "1", since the output 8 of the switching circuit 1 becomes "1", the execution result becomes a value obtained by subtracting the data of the data latch circuit 5 from the data of the arithmetic register 4, thus becoming equal to the execution result of the SUB instruction.

Figure 3:
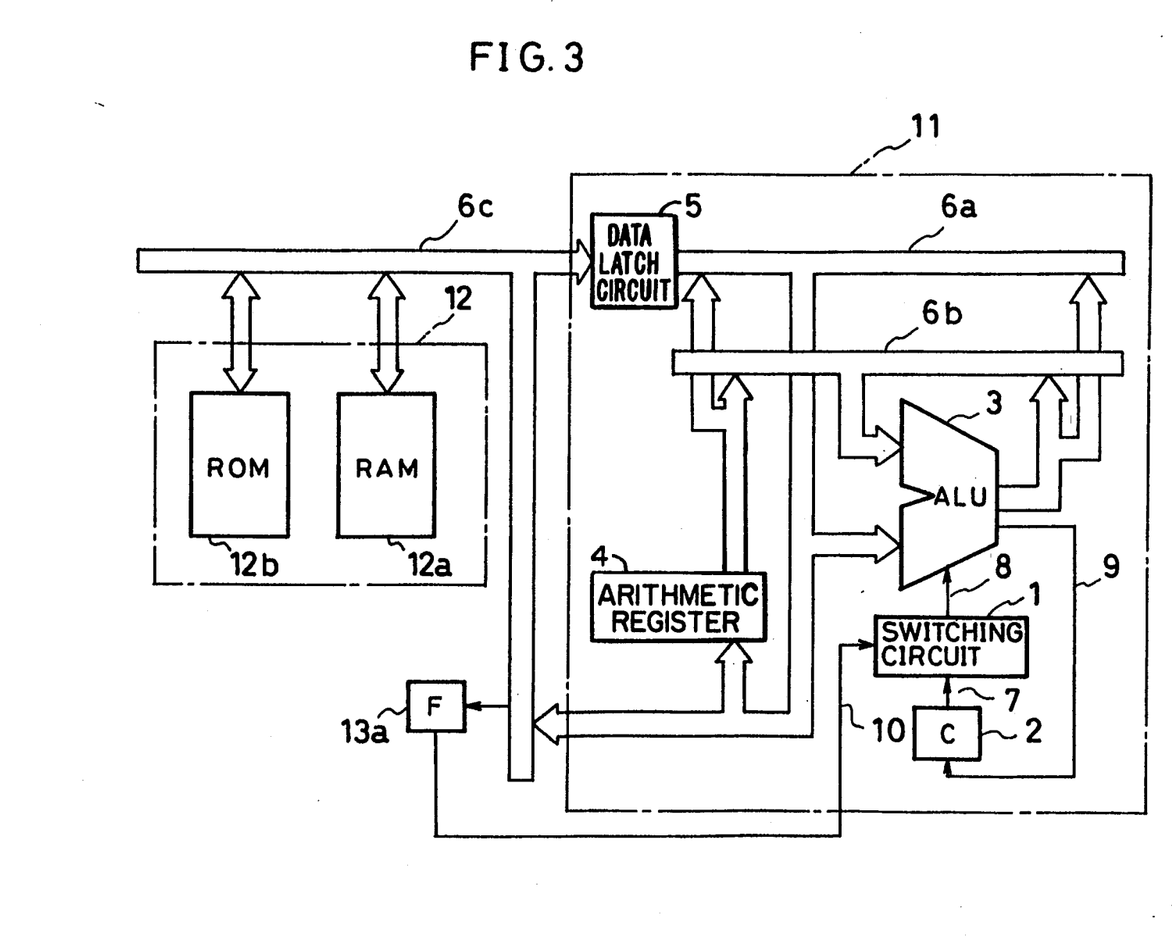
FIG. 3 is a block diagram showing an arrangement of a microcomputer based on an operation system according to a second embodiment of this invention.

In a second embodiment of this invention, as illustrated in FIG. 3, the control signal 10 is arranged to be inputted from a switching flag 13a in which an address is allocated. When executing the ADC instruction or the SBC instruction in accordance with a program in the memory 12, the CPU 11 performs an instruction for writing "0" in the switching flag 13a before the execution of the ADC instruction or the SBC instruction and sets the input 10 of the switching circuit 1 to "0", and on the other hand, when executing the ADD instruction or the SUB instruction, the CPU 11 performs an instruction for writing "1" in the switching flag 13a, thereby allowing an operation similar to the first embodiment.

Figure 4:
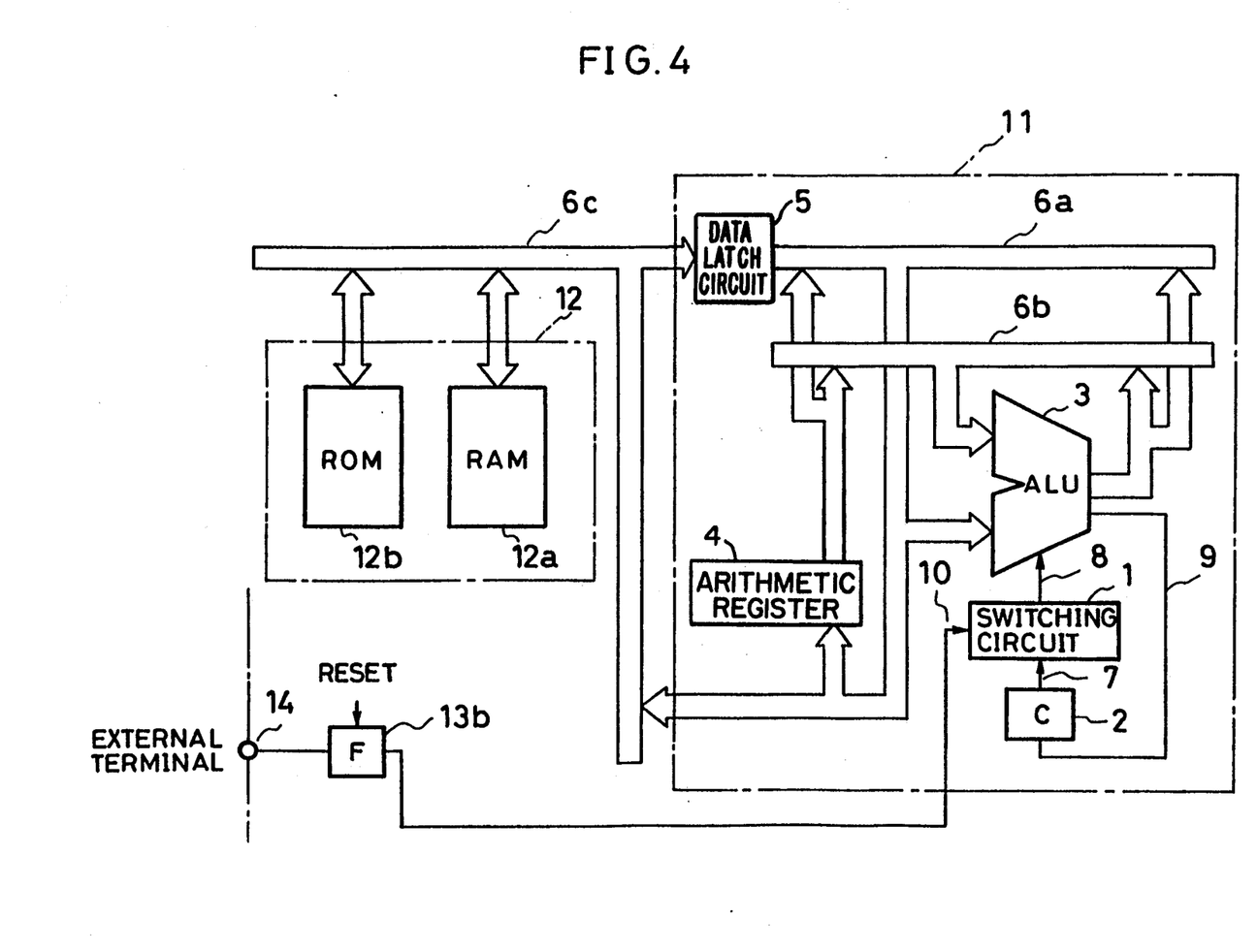
FIG. 4 is a block diagram showing an arrangement of a microcomputer based on an operation system according to a third embodiment of this invention.

In a third embodiment, as shown in FIG. 4, the control signal 10 for the switching operation of the switching circuit 1 is arranged to be inputted from a switching flag 13b for latching the input from an external terminal 14 at the time of the reset. Thus, if the input of the external terminal 14 at the time of the reset is set to "0", after the cancellation of the reset the operation becomes similar to the operation in the ADC instruction or the SBC instruction. If the input of the external terminal 14 at the reset time is set to "1", after the cancellation of the reset the operation becomes similar to the operation in the ADD instruction or the SUB instruction.

Figure 5:
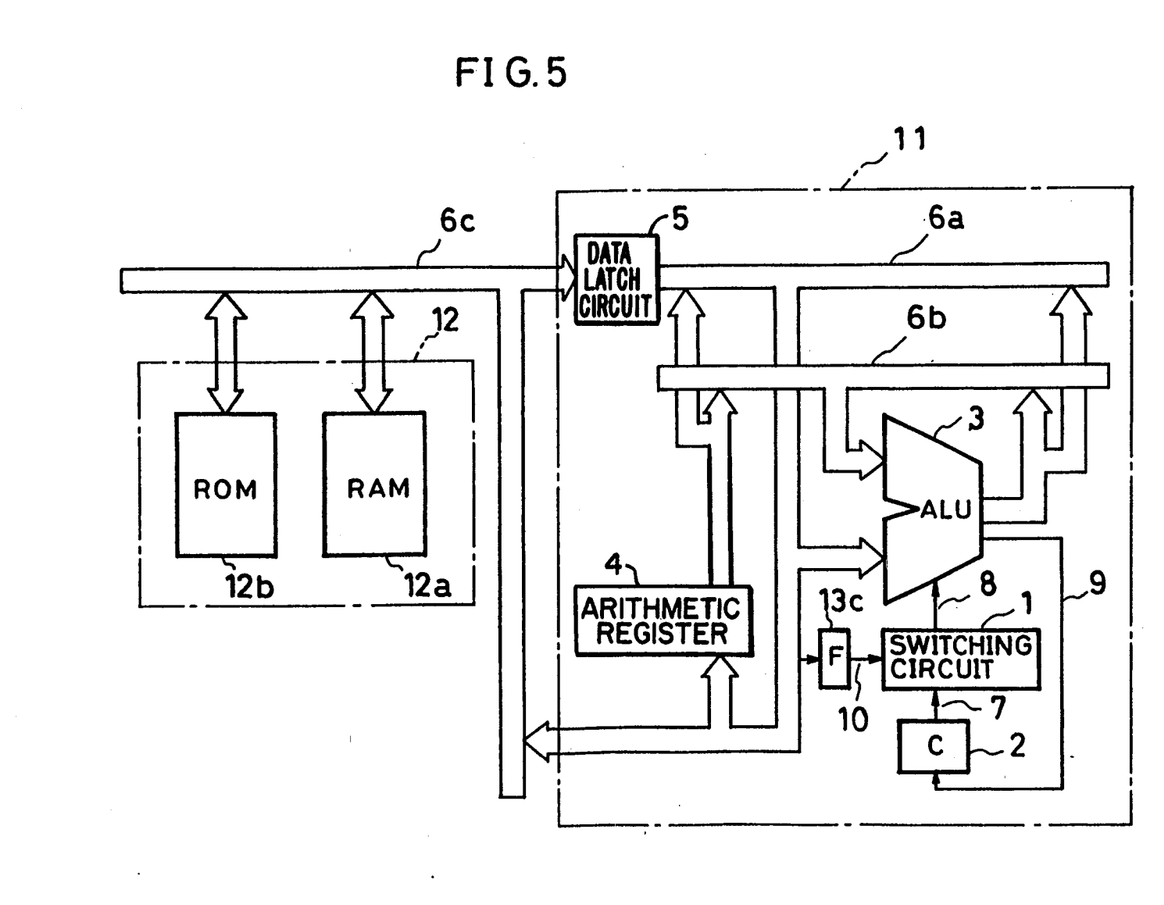
FIG. 5 is a block diagram showing an arrangement of a microcomputer based on an operation system according to a fourth embodiment of this invention.

In a fourth embodiment, as shown in FIG. 5, the control signal 10 for the switching operation of the switching circuit 1 is arranged to be inputted from a switching flag 13c provided within the CPU 11. The switching flag 13c becomes "1" in response to a specific set instruction and becomes "0" in response to a clear instruction. This embodiment can offer an operation similar to the operation in the above-described second embodiment.

Figure 6:
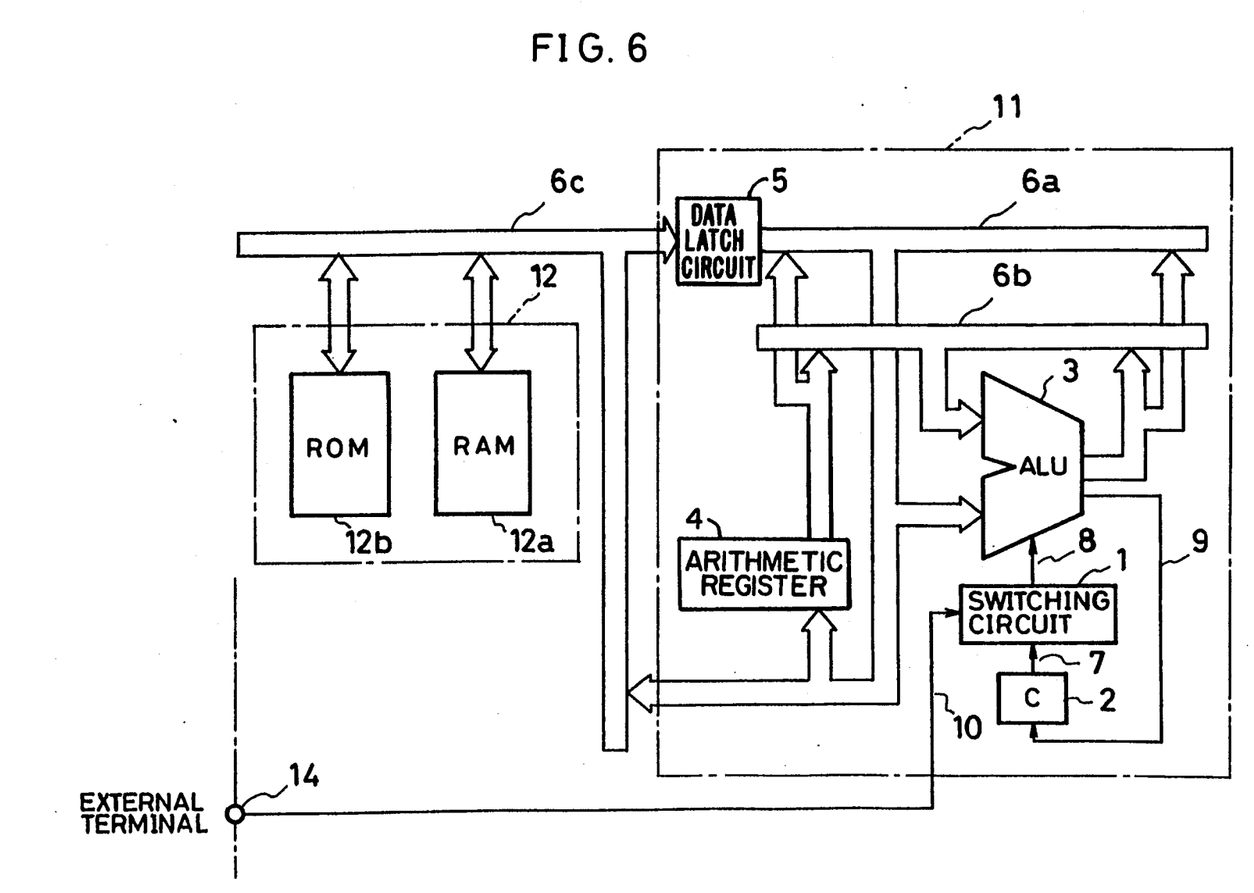
FIG. 6 is a block diagram showing an arrangement of a microcomputer based on an operation system according to a fifth embodiment of this invention.

Further, in a fifth embodiment, as illustrated in FIG. 6, the control signal for the switching operation of the switching circuit 1 is arranged to be inputted from the external terminal 14.

Although in the above-described embodiments the switching between the ADC instruction and the ADD instruction and the switching between the SBC instruction and the SUB instruction are effected by the same control signal, it is appropriate to respectively perform the switching operation by different control signals. In addition, various design changes can be made without departing from the scopes of the claims for this invention. Moreover, in the abovedescribed embodiments, it is appropriate to use an accumulator, a general-use register or the like as the arithmetic register to store the operation data and the calculation results.

As described above, according to this invention, a switching means is provided which changes the content of the carry and borrow flag to be inputted to the arithmetic and logic unit so as to perform, in accordance with the control signal inputted to the switching means, the switching between the operation in which the carry input or borrow input to be inputted to the arithmetic and logic unit is effective and the operation in which the carry input or borrow input is invalid, whereby it is possible to perform the operations with the same instruction. Accordingly, it is possible to perform, with the same operation code (by changing the control signal), the operation in which the carry or borrow input is effective and the operation in which the carry or borrow input is invalid. That is, it is possible to perform different operations by one operation code, and hence it is possible to reduce the number of the operation codes. In addition, since it is not required to increase the operation codes, in a microcomputer or the like having the operation with carry or the operation with borrow, it is possible to increase the number of the operations by slight logic changes.

What is claimed is:

1. An operation system including a central processing unit for performing operations in accordance with a sequence of instructions stored in a memory, said central processing unit comprising:
   a data latch circuit for latching data for operations from said memory;
   an arithmetic register for storing data for operations and for storing operation results;
   a carry and borrow flag for storing a carry indicating that an operation result stored in said arithmetic register exceeds a predetermined number of bits and for storing a borrow indicating a digit borrow when the content of said data latch circuit cannot be subtracted from the content of said arithmetic register;
   an arithmetic logic unit for performing a selected operation using the content of said data latch circuit, the content of said arithmetic register, and a carry and borrow input of said arithmetic logic unit as operation inputs, for updating said arithmetic register responsive to the operation result of said selected operation, and for modifying said carry and borrow flag responsive to said operation result; and
   switching means which selectively couples the content of said carry and borrow flag to said carry and borrow input of said arithmetic logic unit so as to switch, in accordance with a control signal inputted to said switching means, between a first operation in which the carry input or borrow input to said arithmetic and logic unit is effective and a second operation in which the carry input or borrow input is invalid, wherein the first operation and the second operation are both implemented by a single instruction of the central processing unit.

2. An operation system as claimed in claim 1, wherein the switching between the first operation in which the carry input or borrow input to said arithmetic and logic unit is effective and the second operation in which the carry input or borrow input is invalid is effected by a switching flag.

3. An operation system as claimed in claim 1, wherein the switching between the first operation in which the carry input or borrow input to said arithmetic and logic unit is effective and the second operation in which the carry input or borrow input is invalid is effected by a switching flag set by one or more instructions.

4. An operation system as claimed in claim 1, wherein the switching between the first operation in which the carry input or borrow input to said arithmetic and logic unit is effective and the second operation in which the carry input or borrow input is invalid is effected by a switching flag set by an input value to an external terminal at the time of a reset.

5. An operation system as claimed in claim 1, wherein the switching between the first operation in which the carry input or borrow input to said arithmetic logic unit is effective and the second operation in which the carry input or borrow input is invalid is effected by a switching flag which is an internal flag of said central processing unit having a specific set instruction and a reset instruction.

6. An operation system as claimed in claim 1, wherein the switching between the first operation in which the carry input or borrow input to said arithmetic logic unit is effective and the second operation in which the carry input or borrow input is invalid is effected by a switching signal from an external terminal.

7. An operation system as claimed in claim 1, wherein said switching means comprises a switching circuit constructed with a plurality of logic gate circuits to modify the content of said carry and borrow flag.

8. An operation system as claimed in claim 2, 3, 4 or 7, wherein an output of said switching flag is used as the control signal to perform the switching operation of said switching circuit.

9. An operation system as claimed in claim 5 or 7, wherein an internal output of said central processing unit is used as the control signal to perform the switching operation of said switching circuit.

10. An operation system as claimed in claim 5 or 7, wherein said switching signal from said external terminal is used as the control signal to perform the switching operation of said switching circuit.

* * * * *